(12) United States Patent
Tateishi et al.

(10) Patent No.: US 8,163,361 B2
(45) Date of Patent: Apr. 24, 2012

(54) PLIABLE PLASTIC FILM AND CONTAINER USING THE SAME

(75) Inventors: Isamu Tateishi, Naruto (JP); Hitoshi Mori, Tokushima (JP)

(73) Assignee: Otsuka Pharmaceutical Factory, Inc., Tokushima (JP)

( * ) Notice: Subject to any disclaimer, the term of this patent is extended or adjusted under 35 U.S.C. 154(b) by 79 days.

(21) Appl. No.: 12/659,828

(22) Filed: Mar. 23, 2010

(65) Prior Publication Data
US 2010/0179504 A1  Jul. 15, 2010

Related U.S. Application Data

(60) Continuation of application No. 12/292,682, filed on Nov. 24, 2008, now abandoned, which is a division of application No. 11/657,019, filed on Jan. 24, 2007, now abandoned.

(51) Int. Cl.
*B29D 22/00* (2006.01)
*A61B 19/00* (2006.01)

(52) U.S. Cl. ...... 428/35.7; 428/35.2; 604/408; 604/410; 604/416

(58) Field of Classification Search ............... 428/35.7, 428/35.2; 604/408, 410, 416
See application file for complete search history.

(56) References Cited

U.S. PATENT DOCUMENTS

| | | | |
|---|---|---|---|
| 4,436,700 | A | 3/1984 | Erickson |
| 4,961,495 | A | 10/1990 | Yoshida et al. |
| 5,539,056 | A | 7/1996 | Yang et al. |
| 5,885,703 | A | 3/1999 | Wilkie |
| 6,348,271 | B1 | 2/2002 | Nakata et al. |
| 6,514,625 | B1 | 2/2003 | DeMeuse |
| 6,808,822 | B2 | 10/2004 | Rajan et al. |
| 2003/0060578 | A1 | 3/2003 | Schiffino et al. |
| 2004/0137177 | A1 | 7/2004 | Saito et al. |

FOREIGN PATENT DOCUMENTS

| | | |
|---|---|---|
| EP | 829345 A2 | 3/1998 |
| JP | 7-256836 | 10/1995 |
| JP | 9-262948 | 10/1997 |
| JP | 2000-5276 | 1/2000 |
| JP | 2002-301796 | 10/2002 |

OTHER PUBLICATIONS

Fred W. Billmeyer, Jr., "Textbook of Polymer Science," Third Edition, Copyright 1984 by John Wiley & Sons, Inc., pp. 343-344.

*Primary Examiner* — Rena Dye
*Assistant Examiner* — James Yager
(74) *Attorney, Agent, or Firm* — Finnegan, Henderson, Farabow, Garrett & Dunner, L.L.P.

(57) ABSTRACT

A pliable plastic film according to the present invention comprises a heat sealable sealing layer, wherein the sealing layer is made of a mixture of a propylene-α-olefin random copolymer having a crystalline melting point $T_m$ of 135 to 145° C. and a polypropylene (PP) homopolymer having a crystalline melting point $T_m$ of higher than 160° C.

9 Claims, 1 Drawing Sheet

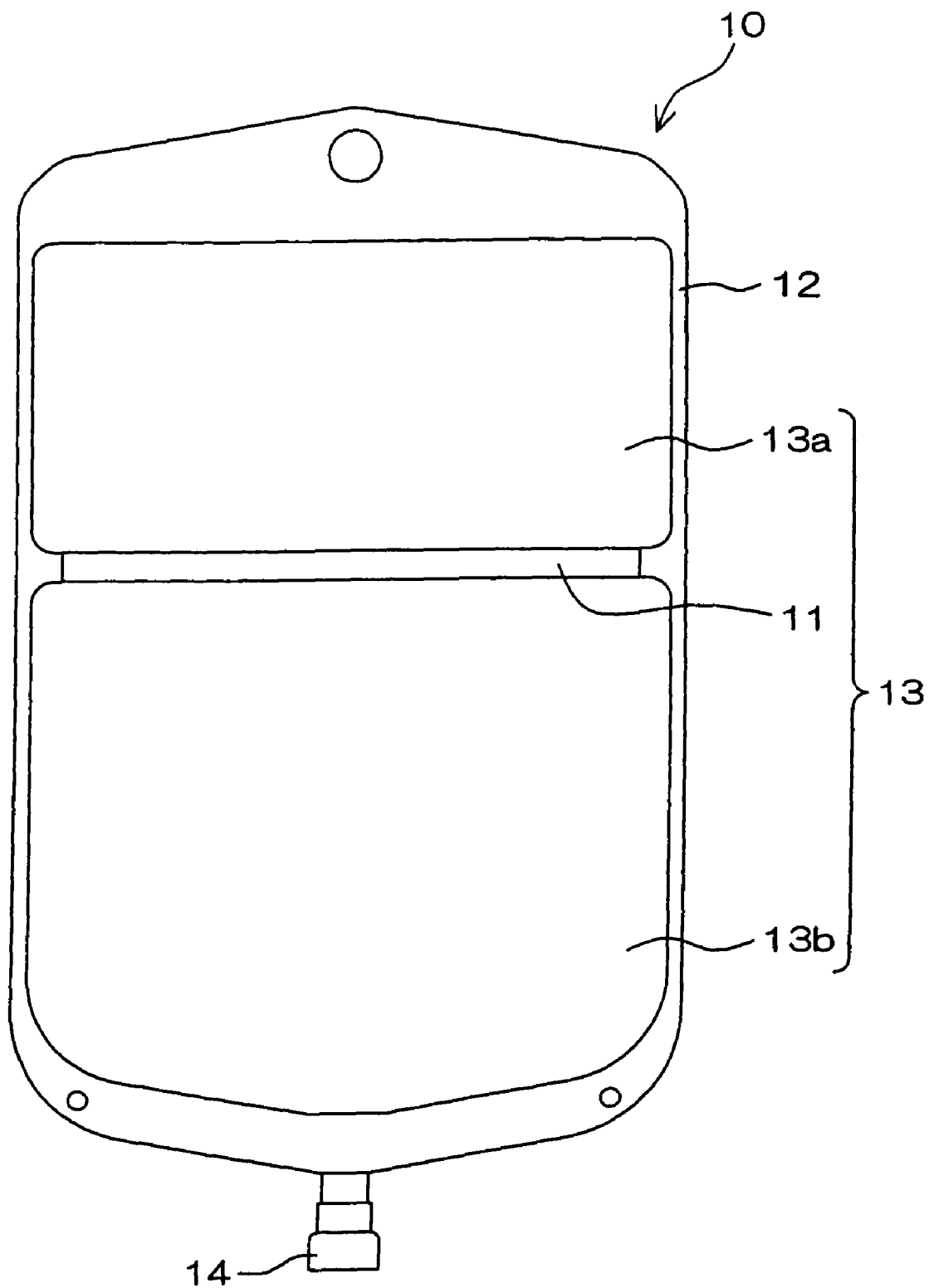

PLIABLE PLASTIC FILM AND CONTAINER USING THE SAME

RELATED APPLICATIONS

This application is a continuation of application Ser. No. 12/292,682, filed Nov. 24, 2008 now abandoned which is a division of application Ser. No. 11/657,019, filed Jan. 24, 2007 now abandoned, the contents of all of which are incorporated herein by reference.

BACKGROUND OF THE INVENTION

1. Field of the Invention

The present invention relates to a pliable plastic film which can maintain a function of an easily releasable sealed portion even after a sterilization treatment at a high temperature of higher than 120° C., and a container using the same.

2. Description of the Related Art

Recently, a multichamber container, which separately contains a plurality of components and is capable of mixing the components in the container when used, is used in the medical field such as infusion solution bag.

The multichamber container comprises a plastic container having pliability, and a plurality of chambers which are partitioned with a so-called easily releasable sealed portion, and the seal strength of the easily releasable sealed portion is adjusted so that the easily releasable sealed portion is released when a pressure is applied by pressing the chamber.

The easily releasable sealed portion is usually formed by heat sealed films made of a mixture of two or more kinds of resins which are inferior in compatibility and have different melting points. A container used in the medical field such as an infusion solution bag is formed by using a resin mixture of polyethylene and polypropylene which have established safety to the human body and stability to medicines (see, for example, Japanese Patent No. 2,675,075).

However, in a medical container containing hyperalimentation solution, peritoneal dialysis fluid, perfusate, irrigation water for surgical operation or the like, sterilization at a high temperature of 120° C. or higher is sometimes required. In such a case, a sterilization treatment temperature exceeds a melting point of polyethylene, and there arise problems such as deformation of the container and increase in the peel strength of the easily releasable sealed portion as a result of the sterilization treatment.

On the other hand, Japanese Unexamined Patent Publication No. 2000-5276 proposes a multichamber container in which an innermost layer constituting the easily releasable sealed portion of the container is formed of a mixture of a syndiotactic polypropylene having a crystalline melting point $T_m$ of 121 to 140° C. and polypropylene having an isotactic pentad fraction of 0.96 or less and a crystalline melting point $T_m$ of 140 to 160° C. for the purpose of maintaining the function of the easily releasable sealed portion even if a sterilization treatment is carried out at 120° C. or higher.

SUMMARY OF THE INVENTION

However, like the above medical container, even if the innermost layer of the container is formed of a mixture of two kinds of polypropylenes having different crystalline melting points $T_m$, when the crystalline melting point $T_m$ of polypropylene having a higher crystalline melting point $T_m$ is 160° C. or lower, there is such a problem that an allowable range of a heat sealing temperature, at which an easily releasable seal can be formed, becomes very narrow as 1° C., as is apparent from Examples described later. Therefore, there is a problem that it becomes necessary to strictly control the heat sealing temperature to form an easily releasable seal and production processes become complicated. Further, there is a problem that easy releasability of the easily releasable seal deteriorates by a slight change of the heat sealing temperature and therefore the yield of the product decreases.

Moreover, the above medical container is not sufficient in heat resistance and blocking may occur by carrying out a sterilization treatment at a high temperature.

Thus, an object of the present invention is to provide a pliable plastic film which is excellent in heat resistance and has a wide allowable range of a heat sealing temperature at which an easily releasable seal can be formed, and to provide a container using the same.

A pliable plastic film according to the present invention comprises a heat sealable sealing layer, wherein the sealing layer is made of a mixture of a propylene-α-olefin random copolymer having a crystalline melting point $T_m$ of 135 to 145° C. and a polypropylene homopolymer having a crystalline melting point $T_m$ of higher than 160° C.

Further, in the pliable plastic film according to the present invention, the content ratio of the polypropylene homopolymer is preferably from 5 to 30% by weight based on the mixture.

In the pliable plastic film according to the present invention, it is preferable that the polypropylene homopolymer has a melting point of more than 160° C. and not more than 170° C. and an isotactic pentad fraction of not less than 0.97.

It is preferable that the pliable plastic film according to the present invention further comprises a layer containing polypropylene formed on the surface of the sealing layer.

It is preferable that the pliable plastic film according to the present invention further comprises a first flexible layer formed on the surface of the sealing layer, a reinforcing layer formed on the surface of the first flexible layer, a second flexible layer formed on the surface of the reinforcing layer, and an outermost layer formed on the surface of the second flexible layer, wherein the first flexible layer is made of a mixture of at least one kind of polymer selected from the group consisting of a propylene-α-olefin random copolymer, a propylene-α-olefin block copolymer and a syndiotactic polypropylene, and an ethylene-α-olefin copolymer elastomer, and the content ratio of the ethylene-α-olefin copolymer elastomer is from 30 to 50% by weight based on the entire first flexible layer, the reinforcing layer is made of at least one kind of polymer selected from the group consisting of a polypropylene homopolymer, a propylene-α-olefin random copolymer, a propylene-α-olefin block copolymer and a cyclo olefin polymer, the second flexible layer is made of a mixture of at least one kind of polymer selected from the group consisting of a propylene-α-olefin random copolymer, a propylene-α-olefin block copolymer and a syndiotactic polypropylene, and an ethylene-α-olefin copolymer elastomer, and the content ratio of the ethylene-α-olefin copolymer elastomer is from 30 to 50% by weight based on the entire second flexible layer, and the outermost layer is made of at least one kind of polymer selected from the group consisting of a polypropylene homopolymer, a propylene-α-olefin random copolymer and a propylene-α-olefin block copolymer.

In the pliable plastic film according to the present invention, it is preferable that the thickness of the first flexible layer and that of the second flexible layer respectively account for 30 to 40% of the entire film thickness.

A container according to the present invention comprises a heat sealable sealing layer, the sealing layer being made of a mixture of a propylene-α-olefin random copolymer having a crystalline melting point $T_m$ of 135 to 145° C. and a polypropylene homopolymer having a crystalline melting point $T_m$ of higher than 160° C., the container being provided with a sealed portion formed by heat sealing the peripheral portions of the pliable plastic films in the state where the sealing layers thereof face with each other.

The container according to the present invention is preferably provided with an easily releasable sealed portion having a smaller peel strength than that of the sealed portion, and is also provided with a plurality of chambers partitioned with the sealed portion and the easily releasable sealed portion.

In the container according to the present invention, it is preferable that the easily releasable sealed portion is heat sealed at a temperature which is higher than a crystalline melting point $T_m$ of the propylene-α-olefin random copolymer having a crystalline melting point $T_m$ of 135 to 145° C. and is lower than a crystalline melting point $T_m$ of the polypropylene homopolymer having a crystalline melting point $T_m$ of higher than 160° C.

The container according to the present invention is preferably subjected, to a sterilization treatment at 121° C.

In the present invention, a crystalline melting point $T_m$ means a melting peak temperature $T_{pm}$ determined by differential scanning calorimetry (DSC). (see Japanese Industrial Standard (JIS) K 7121).

In the present invention, "isotactic pentad fraction" means the proportion in which five propylene units are isotactically bonded continuously in a polymer of propylene (content ratio of mmmm structure; %). This isotactic pentad fraction is calculated as the sum of three heptad fractions of m(mmmm)m, m(mmmm)r and r(mmmm)r based on assignment of a peak of $^{13}$C-NMR spectrum for polypropylene.

According to the pliable plastic film of the present invention, when a container such as infusion solution bag is formed, the resulting container can be excellent in heat resistance. Even if a container provided with the easily releasable sealed portion is formed using the pliable plastic film of the present invention and this container is subjected to, for example, a sterilization treatment at a high temperature of 120° C. or higher, easy releasability of an easily releasable seal does not deteriorate. Moreover, when the easily releasable sealed portion is formed using the pliable plastic film of the present invention, it is possible to obtain a temperature range (allowable range), which is significant for industrial production, of a heat sealing temperature at which the easily releasable sealed portion is formed.

Therefore, the pliable plastic film of the present invention and the container using the same are useful in a medical container which requires a steam sterilization treatment at a high temperature, particularly a multichamber container having an easily releasable seal.

BRIEF DESCRIPTION OF THE DRAWING

FIG. 1 is a front view showing an embodiment of a container of the present invention.

BEST MODE FOR CARRYING OUT THE INVENTION

A pliable plastic film of the present invention comprises a heat sealable sealing layer, and this sealing layer is made of a mixture of a propylene-α-olefin random copolymer having a crystalline melting point $T_m$ of 135 to 145° C. and a polypropylene homopolymer having a crystalline melting point $T_m$ of higher than 160° C.

The melting point of the propylene-α-olefin random copolymer having a melting point of 135 to 145° C., which constitutes a sealing layer, is preferably from 136 to 140° C., and more preferably from 137 to 139° C.

When the melting point of the propylene-α-olefin random copolymer constituting the sealing layer is lower than 135° C., heat resistance of the pliable plastic film and the container using the same deteriorates and blocking is likely to occur. On the other hand, when the melting point of the propylene-α-olefin random copolymer constituting the sealing layer is higher than 145° C., the sealing temperature range where the easily releasable sealed portion can be formed becomes narrow, and industrial productivity of the container provided with the easily releasable sealed portion is lowered. Further, when the melting point of the propylene-α-olefin random copolymer constituting the sealing layer is higher than 145° C., flexibility of the pliable plastic film and the container using the same deteriorates.

Examples of the α-olefin in the propylene-α-olefin random copolymer of the propylene-α-olefin random copolymer having a melting point of 135 to 145° C. include ethylene, or an α-olefin having 4 to 6 carbon atoms such as 1-butene, 1-pentene, 1-hexene or 4-methyl-1-pentene.

In the propylene-α-olefin random copolymer, the content ratio of the α-olefin is not specifically limited, but is preferably from 1 to 5% by weight. With respect to the propylene-α-olefin random copolymer, the ranges of the molecular weight, polymerization degree, molecular weight distribution and the like are not specifically limited and can be appropriately selected within a range where the melting point can be set within the above range.

The propylene-α-olefin random copolymer is preferably a propylene-ethylene random copolymer in which the content ratio of ethylene is from 1 to 3% by weight.

The melting point of the polypropylene homopolymer having a melting point of higher than 160° C., which constitutes the sealing layer, is preferably higher than 160° C. and not more than 170° C., and more preferably from 161 to 165° C.

When the melting point of the polypropylene homopolymer constituting the sealing layer is 160° C. or lower, the sealing temperature range where the easily releasable sealed portion can be formed becomes narrow, and industrial productivity of the container provided with the easily releasable sealed portion is lowered. On the other hand, although the upper limit of the melting point of the propylene-α-olefin random copolymer constituting the sealing layer is not specifically limited, flexibility of the pliable plastic film may deteriorate when the melting point is higher than 170° C.

In the polypropylene homopolymer of the polypropylene homopolymer having a melting point of higher than 160° C., an isotactic pentad fraction is preferably 0.97 or more. The polypropylene having an isotactic pentad fraction of 0.97 or more has very high stereoregularity and high melting point. On the other hand, in polypropylene having an isotactic pentad fraction of less than 0.97, one having a melting point of higher than 160° C. is less.

With respect to the polypropylene homopolymer, the ranges of the molecular weight, polymerization degree, molecular weight distribution and the like are not specifically limited and can be appropriately selected within a range where the melting point can be set within the above range.

In the mixture of the propylene-α-olefin random copolymer having a melting point of 135 to 145° C. and the polypropylene homopolymer having a melting point of higher than 160° C. which constitutes the sealing layer, the content ratio of the polypropylene homopolymer in the mixture is preferably from 5 to 30% by weight, and more preferably from 10 to 20% by weight. When the content ratio of the polypropylene homopolymer having a melting point of higher than 160° C. is more than 30% by weight based on the mixture, flexibility of the pliable plastic film and the container using the same may deteriorate. On the other hand, when the content ratio of the polypropylene homopolymer having a melting point of higher than 160° C. is less than 5% by weight based on the mixture, easy releasability of the pliable plastic film may deteriorate and also the allowable range of the heat sealing temperature, where the easily releasable sealed portion can be formed, may become narrow.

Examples of the pliable plastic film of the present invention include:
(a) a single-layered film composed only of a sealing layer; and
(b) a multi-layered film comprising the sealing layer, and a layer containing polypropylene formed on the surface of the sealing layer.

When the pliable plastic film of the present invention is the single-layered film in (a), the thickness of the film is not specifically limited as far as pliability and flexibility required for the film can be maintained, but is preferably from 150 to 350 μm, and more preferably from 200 to 300 μm.

The single-layered film in (a) can be formed by mixing the propylene-α-olefin random copolymer having the crystalline melting point $T_m$ of 135 to 145° C. with the polypropylene homopolymer having the crystalline melting point $T_m$ of higher than 160° C., and molding the sealing layer by a known molding method such as T-die extrusion molding method or inflation molding method.

In any of the above molding methods, molding must be performed at a temperature at which the mixture of the propylene-α-olefin random copolymer having the crystalline melting point $T_m$ of 135 to 145° C. and the polypropylene homopolymer having the crystalline melting point $T_m$ of higher than 160° C. is melted. However, when the molding temperature is too high, a part of a plastic may cause heat deterioration. Therefore, the molding temperature of the single-layered film is preferably from 200 to 230° C., but is not limited to this range.

When the pliable plastic film of the present invention is the multi-layered film in (b), its specific layer configuration includes:
(i) a multi-layered film comprising the sealing layer, a first flexible layer formed on the surface of the sealing layer, and an outermost layer formed on the surface of the first flexible layer; and
(ii) a multi-layered film comprising the sealing layer, a first flexible layer formed on the surface of the sealing layer, a reinforcing layer formed on the surface of the first flexible layer, a second flexible layer formed on the surface of the reinforcing layer, and an outermost layer formed on the surface of the second flexible layer.

When the pliable plastic film of the present invention is the multi-layered film, the other film constituting the multi-layered film is not specifically limited, except that it is a film having heat resistance which can endure a sterilization treatment, and can be appropriately selected from films made of thermoplastic plastics such as polyolefin, cyclo olefin polymer, polyester and polyamide.

Examples of the polyolefin include homopolyethylene, ethylene-α-olefin copolymer, polypropylene homopolymer, propylene-α-olefin random copolymer and, propylene-α-olefin block copolymer.

Examples of the α-olefin of the ethylene-α-olefin copolymer include α-olefins having 3 to 6 carbon atoms, such as propylene, 1-butene, 1-pentene, 1-hexene and 4-methyl-1-pentene.

Examples of the α-olefin of the propylene-α-olefin random copolymer and the propylene-α-olefin block copolymer include ethylene, and an α-olefin having 4 to 6 carbon atoms such as 1-butene, 1-pentene, 1-hexene or 4-methyl-1-pentene.

Examples of the cyclo olefin polymer include cyclo olefin polymer such as copolymer (or a hydrogenated product thereof) of ethylene and a dicyclopentadiene-based compound, copolymer (or a hydrogenated product thereof) of ethylene and a norbornene-based compound, ring-opening polymer (or a hydrogenated product thereof) of a cyclopentadiene-based compound, and ring-opening copolymer (or a hydrogenated compound thereof) composed of two or more kinds of cyclopentadiene-based compounds.

Examples of the polyester include polyethylene terephthalate (PET) and polybutylene terephthalate (PBT).

Examples of the polyamide include nylons such as nylon-6, nylon-6,6 and nylon-6,10.

The other plastic film is preferably a polyolefin film in view of compatibility with the sealing layer and ease of a lamination treatment, and is particularly preferably polypropylene.

When the pliable plastic film of the present invention is the multi-layered film, the total thickness thereof is not specifically limited as far as pliability and flexibility of the film can be maintained, but is preferably from 150 to 350 μm, and more preferably from 200 to 300 μm.

When the pliable plastic film of the present invention is the multi-layered film, the thickness of the sealing layer is not specifically limited, but is preferably from 20 to 100 μm, and more preferably from 30 to 50 μm, in view of ensuring heat resistance and strength of the heat sealed peripheral portion and the easily releasable sealed portion.

The first flexible layer and second flexible layer (hereinafter, both layers are merely collectively referred to as a "flexible layer", sometimes) are layers for the purpose of imparting flexibility to the entire film without adversely affecting heat resistance of the multi-layered film.

The flexible layer is, for example, a flexible layer made of a mixture of at least one kind of polymer selected from the group consisting of a propylene-α-olefin random copolymer, a propylene-α-olefin block copolymer and a syndiotactic polypropylene, and an ethylene-α-olefin copolymer elastomer, the content ratio of the ethylene-α-olefin copolymer elastomer being from 30 to 50% by weight based on the entire flexible layer. The flexible layer is preferably a flexible layer made of a mixture of a propylene-α-olefin random copolymer and an ethylene-α-olefin copolymer elastomer, the content ratio of the ethylene-α-olefin copolymer elastomer being form 30 to 50% by weight based on the total amount of the propylene-α-olefin random copolymer and the ethylene-α-olefin copolymer elastomer, and more preferably a flexible layer made of a mixture of a propylene-ethylene random copolymer and an ethylene-α-olefin copolymer elastomer, the content ratio of the ethylene-α-olefin copolymer elastomer being from 30 to 50% by weight based on the total amount of the propylene-α-olefin random copolymer and the ethylene-α-olefin copolymer elastomer.

The α-olefin in the propylene-α-olefin random copolymer and the propylene-α-olefin block copolymer, which constitute the flexible layer, is the same α-olefin as that in the propylene-α-olefin random copolymer having a melting point of 135 to 145° C., which constitutes the sealing layer, and is preferably ethylene.

Examples of the syndiotactic polypropylene constituting the flexible layer include polypropylene synthesized using a metallocene catalyst.

With respect to the propylene-α-olefin random copolymer, propylene-α-olefin block copolymer and syndiotactic polypropylene, although the ranges of the melting point, molecular weight, polymerization degree, molecular weight distribution and the like thereof are not specifically limited, the melting point is preferably from about 135 to 145° C. in view of ensuring flexibility of the flexible layer.

The α-olefin in the ethylene-α-olefin copolymer elastomer constituting the flexible layer includes, for example, an α-olefin having 3 to 6 carbon atoms such as propylene, 1-butene, 1-pentene, 1-hexene or 4-methyl-1-pentene, and is preferably 1-butene.

The ethylene-α-olefin copolymer elastomer is not specifically limited but the density is preferably from 0.880 to 0.910 g/cm$^3$.

The mixture of at least one kind of polymer selected from the group consisting of a propylene-α-olefin random copolymer, a propylene-α-olefin block copolymer and a syndiotactic polypropylene, and an ethylene-α-olefin copolymer elastomer, which constitutes the flexible layer, can be appropriately mixed with a styrene-based thermoplastic elastomer, a polypropylene homopolymer having a melting point of higher than 160° C., and process oil in view of adjustment of flexibility of the film.

Examples of the styrene-based thermoplastic elastomer include a styrene-ethylene/butylene-styrene block copolymer (SEBS), a styrene-butadiene-styrene block copolymer (SBS), a styrene-isoprene-styrene block copolymer (SIS), a modified SEBS modified with maleic acid, a styrene-ethylene/propylene-styrene block copolymer (SEPS), a styrene-ethylene/butylene block copolymer (SEB) and a styrene-ethylene/propylene block copolymer (SEP).

Examples of the polypropylene homopolymer having a melting point of higher than 160° C. include the same polypropylene homopolymer as the polypropylene homopolymer having a melting point of higher than 160° C., which constitutes the sealing layer.

The content ratio of the styrene-based thermoplastic elastomer or the polypropylene homopolymer based on the mixture of at least one kind of polymer selected from the group consisting of a propylene-α-olefin random copolymer, a propylene-α-olefin block copolymer and a syndiotactic polypropylene, and an ethylene-α-olefin copolymer elastomer, which constitutes the flexible layer, is not specifically limited, but the content ratio of the styrene-based thermoplastic elastomer or the polypropylene homopolymer based on the total amount of the mixture is preferably from 10 to 30% by weight.

Examples of the process oil include paraffinic process oil (manufactured by Idemitsu Kosan Co., Ltd. under the trade name of "PW-90", "PW-380", and "PS-90", etc.) and olefinic process oil (manufactured by Matsumura Oil Co., Ltd. under the trade name of "P18", "P380", "P46", etc.).

The content ratio of the process oil based on the mixture of at least one kind of polymer selected from the group consisting of a propylene-α-olefin random copolymer, a propylene-α-olefin block copolymer and a syndiotactic polypropylene, and an ethylene-α-olefin copolymer elastomer, which constitutes the flexible layer, is not specifically limited, but can be appropriately set within a range where a phenomenon of oozing of the process oil on the surface of a pliable plastic film can be prevented.

When the pliable plastic film of the present invention is the multi-layered film, the thickness of the flexible layer is not specifically limited, but is preferably from 60 to 80% based on the entire film thickness.

The reinforcing layer is a layer formed for the purpose of preventing generation of defective products as a result of softening or flow of the flexible layer, for example, due to a sterilization treatment at a high temperature.

Examples of the reinforcing layer include those made of at least one kind of polymer selected from the group consisting of a polypropylene homopolymer, a propylene-α-olefin random copolymer, a propylene-α-olefin block copolymer and a cyclo olefin polymer.

Examples of the polypropylene homopolymer constituting the reinforcing layer include a polypropylene homopolymer having a melting point of higher than 160° C., which constitutes the sealing layer.

The α-olefin in the propylene-α-olefin random copolymer and the propylene-α-olefin block copolymer, which constitute the reinforcing layer, is the same α-olefin as in the propylene-α-olefin random copolymer having a melting point of 135 to 145° C., which constitutes the sealing layer, and preferably ethylene.

Examples of the cyclo olefin polymer include the same cyclo olefin polymer as those described above. The cyclo olefin polymer whose glass transition temperature is from 100 to 170° C. is preferable, although it is not limited thereto.

When maintenance of flexibility of the pliable plastic film is considered to be important, the propylene-α-olefin random copolymer having a melting point of 135 to 145° C. is preferably used for the reinforcing layer. On the other hand, when the film strength and heat resistance of the pliable plastic film are considered to be important, a polypropylene homopolymer having a melting point of higher than 160° C. or a cyclo olefin polymer is preferably used as the material of the reinforcing layer.

The thickness of the reinforcing layer is not specifically limited, but preferably from 3 to 15% based on the entire pliable plastic film thickness.

The outermost layer is a layer formed for the purpose of preventing generation of defective products as a result of softening or flow of the flexible layer, for example, due to a sterilization treatment at a high temperature.

Examples of the outermost layer include those made of at least one kind of polymer selected from the group consisting of a polypropylene homopolymer, a propylene-α-olefin random copolymer and a propylene-α-olefin block copolymer.

Examples of the polypropylene homopolymer constituting the outermost layer include a polypropylene homopolymer having a melting point of higher than 160° C., which constitutes the sealing layer.

The α-olefin in the propylene-α-olefin random copolymer and the propylene-α-olefin block copolymer, which constitute the reinforcing layer, is the same α-olefin as in the propylene-α-olefin random copolymer having a melting point of 135 to 145° C., which constitutes the sealing layer, and preferably ethylene.

The composition of the plastic film constituting the outermost layer can be appropriately decided in light of the strength, heat resistance, flexibility and the like of the entire pliable plastic film.

The multi-layered film can be produced by molding the sealing layer, the first flexible layer and the reinforcing layer, or the sealing layer, the first flexible layer, the reinforcing layer, the second flexible layer and the outermost layer through a known extrusion lamination method such as T-die coextrusion molding method or multilayer inflation molding method, and laminating the resulting layers.

In any of the above-mentioned molding methods, molding must be performed at the temperature at which a plastic constituting each layer is melted. However, when the molding temperature is too high, a part of the plastic may cause heat deterioration. Therefore, the molding temperature of the multi-layered film is preferably from 200 to 230° C., although it is not limited thereto.

According to the pliable plastic film of the present invention, excellent heat resistance can be imparted to a container such as an infusion solution bag formed using this pliable plastic film. When the container is provided with an easily releasable sealed portion, easy releasability of an easily releasable seal can be maintained even if the container is subjected to a sterilization treatment at a high temperature. Moreover, when the easily releasable sealed portion is formed in the container such as an infusion solution bag by using this pliable plastic film, it is possible to obtain a temperature range (allowable range), which is significant for industrial production, of a heat sealing temperature at which the easily releasable sealed portion is formed.

Therefore, the pliable plastic film of the present invention is suited for use as a material constituting the container such as an infusion solution bag, particularly a material constituting a medical container which requires a sterilization treatment at a high temperature such as steam sterilization treatment or hot water sterilization treatment.

As shown in FIG. 1, for example, the container 10 of the present invention is provided with a sealed portion 12 formed by heat sealing the peripheral portions of the pliable plastic films in the state of being laid one upon another so that the sealing layers thereof face with each other.

Specifically, the container can be produced by the following procedure:

Two single-layered films extrusion-molded by a T-die method are laid one upon another and peripheral portions thereof are heat sealed to form a sealed portion, followed by molding into a bag or a tube.

The two multi-layered films coextrusion-molded by a T-die method are laid one upon another so that sealing layers thereof face each other, and peripheral portions thereof are heat sealed to form a sealed portion, followed by molding into a bag or a tube.

The single-layered film inflation-molded is folded back on itself and a peripheral portion thereof is heat sealed to form a sealed portion, followed by molding into a bag or a tube.

The multi-layered film molded in a state where a sealed layer is formed inside is folded back on itself and a peripheral portion thereof is heat sealed to form a sealed portion, followed by molding into a bag or a tube.

Heat sealing of the peripheral portion is conducted under the conditions of a temperature of 170° C. or higher, and preferably from 180 to 200° C., for about 3 to 5 seconds, although the conditions are not limited thereto.

When the container is provided with an easily releasable seal, a heat sealing temperature, at which an easily releasable seal is provided, is set to a temperature which is higher than a melting point of the propylene-α-olefin random copolymer having a melting point of 135 to 145° C. and is lower than a melting point of the polypropylene homopolymer having a melting point of higher than 160° C.

Heat sealing conditions in case of forming an easily releasable seal are appropriately set so that the peel strength of the easily releasable seal can be set within a range from 3.92 to 5.88 N/15 mm (about 0.4 to 0.6 kgf/15 mm) even after the container is subjected to a sterilization treatment at 121° C. Specifically, heat sealing is preferably conducted under the conditions of a temperature of 140 to 155° C., more preferably from 140 to 145° C., for about 4 to 5 seconds.

The peel strength is measured in accordance with the method described in JIS Z 0237 "Testing methods of pressure-sensitive adhesive tapes and sheets" (180° peel method). This peel strength is measured by cutting a pliable plastic film from the easily releasable sealed portion as a starting point at a width of 15 mm, pulling a pair of film portions of the measured sample thus obtained at an angle of 180° and a speed of 200 mm/min and measuring the strength (N/15 mm) when the easily releasable seal is peeled off.

As described above, the container of the present invention is formed using the pliable plastic film of the present invention. Therefore, the container of the present invention can be subjected to, for example, a sterilization treatment at a high temperature, specifically, steam sterilization treatment or hot water sterilization treatment, for example, at a temperature within a range from 100 to 121° C., and preferably from 106 to 121° C. Even after subjecting to the sterilization treatment, easy releasabilty can be maintained in the easily releasable sealed portion of the container of the present invention.

The container of the present invention is excellent in heat resistance and, for example, even if the container provided with an easily releasable sealed portion is subjected to a sterilization treatment at a high temperature, easy releasability of the easily releasable seal can be maintained. When the container of the present invention is provided with an easily releasable sealed portion, it is possible to impart a temperature range (allowable range), which is significant for industrial production, to a heat sealing temperature at which the easily releasable sealed portion is formed. Thus, the manufacturing conditions for the container are advantageous.

Therefore, the container of the present invention is useful in a medical container such as infusion solution bag, which requires, for example, a steam sterilization treatment at a high temperature, particularly a multichamber container having an easily releasable seal.

EXAMPLES

The present invention will now be described in more detail by way of Examples and Comparative Examples, but the present invention is not limited thereto.

Abbreviations, physical properties, manufacturers and trade names of film forming materials used in the following Examples and Comparative Examples are shown below.

PP1: Polypropylene-α-olefin random copolymer (crystalline melting point $T_m$: 138° C., manufactured by Mitsui Chemicals, Inc. under the trade name of "Mitsui POLYPRO F327")

PP2: Polypropylene homopolymer (crystalline melting point $T_m$: 163° C., isotactic pentad fraction 0.97, manufactured by Mitsui Chemicals, Inc. under the trade name of "Mitsui POLYPRO J103")

PP3: Polypropylene-α-olefin random copolymer (crystalline melting point $T_m$: 130° C., manufactured by Mitsui Chemicals, Inc. under the trade name of "Mitsui POLYPRO F337")

PP4: Polypropylene homopolymer (crystalline melting point $T_m$: 160° C., isotactic pentad fraction 0.96, manufactured by Mitsui Chemicals, Inc. under the trade name of "Mitsui POLYPRO F107")

COP: Hydrogenated ring-opening polymer of norbornene-based monomer (specific gravity: 1.01, glass transition temperature: 105° C., manufactured by ZEON Corporation "ZEONOR® 1020R")

PEE: Ethylene-1-butene copolymer (density: 0.885 g/cm$^3$, manufactured by Mitsui Chemicals, Inc. "TAFMER® A0585X")

Example 1 and Comparative Examples 1 to 3

Pliable plastic films having the layer configuration shown in Table 1 below were produced and also containers (infusion solution bag) 10 shown in FIG. 1 were produced using the films.

The pliable plastic films produced in Example 1 and Comparative Examples 1 to 3 were obtained by laminating five layers of a sealing layer, a first flexible layer, a reinforcing layer, a second flexible layer and an outermost layer in this order from one surface, and the thickness of each layer was set to 30 μm, 90 μm, 20 μm, 90 μm and 20 μm in this order from the sealing layer.

The pliable plastic films were formed as an inflation film comprising a sealing layer as an inner layer by a multilayer inflation method.

TABLE 1

| | Upper columns: Kinds of plastics constituting layers Lower columns: Mixing ratios (weight ratios) of plastics | | | | |
|---|---|---|---|---|---|
| | Sealing layer (30 μm) | First flexible layer (90 μm) | Reinforcing layer (20 μm) | Second flexible layer (90 μm) | Outermost layer (20 μm) |
| Example 1 | PP1 + PP2 (85:15) | PP1 + PEE (60:40) | PP1 | PP1 + PEE (60:40) | PP1 |
| Comparative Example 1 | PP3 + PP2 (85:15) | PP1 + PEE (60:40) | PP1 | PP1 + PEE (60:40) | PP1 |
| Comparative Example 2 | PP3 + PP4 (85:15) | PP1 + PEE (60:40) | PP1 | PP1 + PEE (60:40) | PP1 |
| Comparative Example 3 | PP1 + PP4 (85:15) | PP1 + PEE (60:40) | PP1 | PP1 + PEE (60:40) | PP1 |

The inflation film having the layer configuration shown in Table 1 was cut into a predetermined length and the peripheral portion was heat sealed at 195° C. for 5 seconds to form a sealed portion 12, thus obtaining a container (infusion solution bag) 10 having pliability (see FIG. 1).

In this container 10, the intermediate portion of a chamber 13 was heat sealed at 140 to 145° C. for 4.5 seconds to form an easily releasable sealed portion 11.

The easily releasable sealed portion 11 was formed by varying the sealing temperature in the respective Examples and Comparative Examples. Specifically, the sealing temperature was varied at a pitch of 0.1° C. within a range from 122 to 152° C.

As a port member 14 of the container 10, a port type port member comprising an outer frame made of polyethylene and a plug body made of a styrene-based thermoplastic elastomer was used.

An upper chamber 13a of the container was filled with 720 mL of physiological saline and a lower chamber 13b was filled with 1,280 mL of physiological brine, followed by sealing and further high-pressure steam sterilization at 121° C. for 20 minutes. A peel strength (N/15 mm, JIS Z 0237) of the easily releasable seal 11 after being subjected to the sterilization treatment was measured using an autograph manufactured by Shimadzu Corporation.

As a result of the measurement, the temperature range (° C.) of heat sealing, at which the peel strength of the easily releasable seal could be maintained within a range from 3.92 to 5.88 N/15 mm even after the sterilization treatment, and an allowable temperature (° C.) indicated by the temperature range were determined.

The above results are shown in Table 2.

TABLE 2

| | Heat sealing temperature range | Allowable temperature |
|---|---|---|
| Example 1 | 143.0 to 145.0° C. | 2.0° C. |
| Comparative Example 1 | — | — |
| Comparative Example 2 | — | — |
| Comparative Example 3 | 131.0 to 132.0° C. | 1.0° C. |

As shown in Table 2, in all the containers made of the pliable plastic film of Example 1, allowable sealing temperature ranges of the easily releasable seal were 2° C. or more.

On the other hand, in the pliable plastic film of Comparative Example 3, a sealing temperature was within a range from 131.0 to 132.0° C. and the allowable range was very narrow as 1.0° C., and therefore, it was difficult to control the sealing temperature and defective products were likely to be generated, resulting in low yield.

In the pliable plastic films of Comparative Examples 1 and 2, a blocking phenomenon in which inner faces of the container are fused with each other, and deterioration of easy releasability due to an increase of the peel strength of an easily releasable seal occurred after the sterilization treatment.

Examples 2 to 8

In the same manner as in Example 1, except for employing the layer configuration shown in Table 3 below, a pliable plastic film was produced and also a container (infusion solution bag) 10 shown in FIG. 1 was produced using the film in the same manner as in Example 1.

TABLE 3

| | Sealing layer (30 μm) | First flexible layer (90 μm) | Reinforcing layer (20 μm) | Second flexible layer (90 μm) | Outermost layer (20 μm) |
|---|---|---|---|---|---|
| Example 2 | PP1 + PP2 (95:5) | PP1 + PEE (60:40) | PP1 | PP1 + PEE (60:40) | PP1 |
| Example 3 | PP1 + PP2 (90:10) | PP1 + PEE (60:40) | PP1 | PP1 + PEE (60:40) | PP1 |
| Example 4 | PP1 + PP2 (80:20) | PP1 + PEE (60:40) | PP1 | PP1 + PEE (60:40) | PP1 |
| Example 5 | PP1 + PP2 (70:30) | PP1 + PEE (60:40) | PP1 | PP1 + PEE (60:40) | PP1 |
| Example 6 | PP1 + PP2 (85:15) | PP1 + PEE (60:40) | PP2 | PP1 + PEE (60:40) | PP1 |
| Example 7 | PP1 + PP2 (85:15) | PP1 + PEE (60:40) | COP | PP1 + PEE (60:40) | PP1 |
| Example 8 | PP1 + PP4 (85:15) | PP1 + PEE (60:40) | PP1 | PP1 + PEE (60:40) | PP1 + PP2 (50:50) |

Upper columns: Kinds of plastics constituting layers
Lower columns: Mixing ratios (weight ratios) of plastics With respect to the containers (infusion solution bags) 10 produced using the pliable plastic films of Examples 2 to 8, the peel strength (N/15 mm) was measured while varying the sealing temperature at which the easily releasable sealed portion is formed, in the same manner as in Example 1. As a result, the allowable temperature ranges (° C.) of heat sealing, at which the peel strength of the easily releasable seal could be maintained within a range from 3.92 to 5.88 N/15 mm, were 2° C. or more in Examples 2 to 8.

While the illustrative embodiments and examples of the present invention are provided in the above description, such are for illustrative purpose only and not to be construed restrictively. Modification and variation of the present invention which will be obvious to those skilled in the art are to be covered in the following claims.

The disclosure of Japanese patent application No. 2004-203831, filed on Jul. 9, 2004, is incorporated herein by reference.

What is claimed is:

1. A multichamber infusion solution bag, comprising:
a bag mainbody having a rectangular bag shape formed from a pliable plastic film comprising a heat sealable sealing layer, the bag mainbody being formed by heat sealing peripheral portions of a pair of pliable plastic films being laid one upon another so that the sealing layers thereof face with each other, wherein the sealing layers are inside layers of the bag;
a sealed portion for enclosing a chamber for filling with an infusion solution formed by heat sealing the peripheral portions of the pair of pliable plastic films; and
an easily releasable sealed portion for dividing an upper chamber and a lower chamber of said chamber, the easily releasable sealed portion being formed by heat sealing an intermediate portion of the chamber, wherein one end and an other end of the easily releasable sealed portion are connected with the peripheral sealed portions respectively,
the sealing layer being made of a mixture of a polypropylene-α-olefin random copolymer having a crystalline melting point Tm of 138° C. and a polypropylene homopolymer having a crystalline melting point Tm of 163° C.;
an allowable sealing temperature range of the easily releasable sealed portion being at least a two degrees range and
a peel strength of said easily releasable sealed portion being set within a range from 3.92 to 5.88 N/15 mm after a sterilization treatment, which is measured in accordance with the method described in JIS Z 0237 as 180° peel method, the peel strength of said easily releasable sealed portion being weaker than a peel strength of said peripheral sealed portions.

2. The multichamber infusion solution bag according to claim 1, further comprising a layer containing polypropylene formed on an outer side of the sealing layer.

3. The multichamber infusion solution bag according to claim 1, wherein the pliable plastic film comprises a first flexible layer formed on a surface of the sealing layer, a reinforcing layer formed on a surface of the first flexible layer, a second flexible layer formed on a surface of the reinforcing layer, and an outermost layer formed on a surface of the second flexible layer, wherein
the first flexible layer is made of a mixture of at least one kind of polymer selected from the group consisting of a propylene-α-olefin random copolymer, a propylene-α-olefin block copolymer and a syndiotactic polypropylene, and an ethylene-α-olefin copolymer elastomer, and the content ratio of the ethylene-α-olefin copolymer elastomer is from 30 to 50% by weight based on an entire of the first flexible layer,
the reinforcing layer is made of at least one kind of polymer selected from the group consisting of a polypropylene homopolymer, a propylene-α-olefin random copolymer, a propylene-α-olefin block copolymer and a cyclo olefin polymer,
the second flexible layer is made of a mixture of at least one kind of polymer selected from the group consisting of a propylene-α-olefin random copolymer, a propylene-α-olefin block copolymer and a syndiotactic polypropylene, and an ethylene-α-olefin copolymer elastomer, and the content ratio of the ethylene-α-olefin copolymer elastomer is from 30 to 50% by weight based on an entire of the second flexible layer, and
the outermost layer is made of at least one kind of polymer selected from the group consisting of a polypropylene homopolymer, a propylene-α-olefin random copolymer and a propylene-α-olefin block copolymer.

4. The multichamber infusion solution bag according to claim 3, wherein the thicknesses of the first flexible layer and the second flexible layer respectively account for 30 to 40% of an entire thickness of the film.

5. The multichamber infusion solution bag according to claim 1, wherein the sterilization treatment is at 121° C.

6. The multichamber infusion solution bag according to claim 5, wherein the sterilization treatment is at 121° C. for 20 minutes.

7. The multichamber infusion solution bag according to claim 1, wherein a content ratio of the polypropylene-α-olefin random copolymer and the polypropylene homopolymer is 95 to 70:5 to 30 by weight based on the mixture.

8. The multichamber infusion solution bag according to claim 7, wherein the sealing layer has a thickness of 30 μm.

9. The multichamber infusion solution bag according to claim 1, wherein the polypropylene homopolymer has an isotactic pentad fraction 0.97.

* * * * *